(12) United States Patent
Johnson

(10) Patent No.: US 7,731,765 B2
(45) Date of Patent: Jun. 8, 2010

(54) AIR BATTERY AND MANUFACTURING METHOD

(75) Inventor: Lonnie G. Johnson, Atlanta, GA (US)

(73) Assignee: Excellatron Solid State, LLC, Atlanta, GA (US)

(*) Notice: Subject to any disclaimer, the term of this patent is extended or adjusted under 35 U.S.C. 154(b) by 83 days.

(21) Appl. No.: 11/684,117

(22) Filed: Mar. 9, 2007

(65) Prior Publication Data
US 2009/0325017 A9      Dec. 31, 2009

Related U.S. Application Data

(63) Continuation-in-part of application No. 11/059,942, filed on Feb. 17, 2005.

(60) Provisional application No. 60/781,399, filed on Mar. 10, 2006, provisional application No. 60/546,683, filed on Feb. 20, 2004.

(51) Int. Cl.
  *H01M 2/14*    (2006.01)
  *H01M 12/06*   (2006.01)
(52) U.S. Cl. .......... 29/623.1; 29/623.4; 29/623.5; 429/27; 429/29; 429/231.95; 429/247
(58) Field of Classification Search .......... None
See application file for complete search history.

(56) References Cited

U.S. PATENT DOCUMENTS

| | | | |
|---|---|---|---|
| 3,237,078 A | 2/1966 | Mallory | |
| 3,393,355 A | 7/1968 | Whoriskey et al. | |
| 4,040,410 A | 8/1977 | Libowitz | |
| 4,049,877 A | 9/1977 | Saillant et al. | |
| 4,092,464 A | 5/1978 | Dey et al. | |
| 4,098,958 A | 7/1978 | Bettman | |
| 4,303,877 A | 12/1981 | Meinhold | |

(Continued)

FOREIGN PATENT DOCUMENTS

EP        0 055 855       7/1982

(Continued)

OTHER PUBLICATIONS

Fragnaud et al.; Characterization of sprayed and sputter deposited LiCoO2 thin films for rechargeable microbatteries; (Journal of Power Sources 63 (1996) pp. 187-191).

(Continued)

*Primary Examiner*—Jonathan Crepeau
(74) *Attorney, Agent, or Firm*—Baker Donelson

(57) ABSTRACT

A battery (10) is disclosed having a lithium foil anode (11) embedded within a liquid electrolyte (12) which is positioned between two similarly constructed battery cathode halves (13) and (14). Each cathode half has a first glass barrier (16) coupled to a first porous metal substrate (17), a second glass barrier (18) coupled to a second porous metal substrate (19), a third glass barrier (20) coupled to a third porous metal substrate (21), and a lithium air cathode (22). A peripheral layer of edge sealant (25) surrounds the peripheral edge of the electrolyte and bonds the two halves together. The battery also includes an anode terminal (27) coupled to the anode and a cathode terminal (28) coupled to the cathode.

6 Claims, 4 Drawing Sheets

U.S. PATENT DOCUMENTS

| | | | |
|---|---|---|---|
| 4,422,500 A | 12/1983 | Nishizaki et al. |
| 4,523,635 A | 6/1985 | Nishizaki et al. |
| 4,562,511 A | 12/1985 | Nishino et al. |
| 4,591,539 A | 5/1986 | Oltman et al. |
| 4,614,905 A | 9/1986 | Petersson et al. |
| 4,654,281 A | 3/1987 | Anderman et al. |
| 4,677,038 A | 6/1987 | Salomon |
| 4,692,390 A | 9/1987 | Roy |
| 4,719,401 A | 1/1988 | Altmejd |
| 4,781,029 A | 11/1988 | SerVaas |
| 4,818,638 A | 4/1989 | Roy |
| 5,139,895 A | 8/1992 | Roy et al. |
| 5,270,365 A | 12/1993 | Gertz et al. |
| 5,291,116 A | 3/1994 | Feldstein |
| 5,306,577 A | 4/1994 | Sprouse |
| 5,314,765 A | 5/1994 | Bates |
| 5,336,573 A | 8/1994 | Zuckerbrod et al. |
| 5,338,625 A | 8/1994 | Bates et al. |
| 5,362,581 A | 11/1994 | Chang et al. |
| 5,387,857 A | 2/1995 | Honda et al. |
| 5,436,091 A | 7/1995 | Shackle et al. |
| 5,445,906 A | 8/1995 | Hobson et al. |
| 5,455,126 A | 10/1995 | Bates et al. |
| 5,498,489 A | 3/1996 | Dasgupta et al. |
| 5,512,147 A | 4/1996 | Bates et al. |
| 5,532,074 A | 7/1996 | Golben |
| 5,540,741 A | 7/1996 | Gozdz et al. |
| 5,547,782 A | 8/1996 | Dasgupta et al. |
| 5,561,004 A | 10/1996 | Bates et al. |
| 5,567,210 A | 10/1996 | Bates et al. |
| 5,569,520 A | 10/1996 | Bates |
| 5,571,634 A | 11/1996 | Gozdz et al. |
| 5,584,893 A | 12/1996 | Mitchell |
| 5,588,971 A | 12/1996 | Fauteux et al. |
| 5,591,544 A | 1/1997 | Fauteux et al. |
| 5,597,659 A | 1/1997 | Morigaki et al. |
| 5,597,660 A | 1/1997 | Bates et al. |
| 5,612,152 A | 3/1997 | Bates |
| 5,654,084 A | 8/1997 | Egert |
| 5,778,515 A | 7/1998 | Menon |
| 5,783,928 A | 7/1998 | Okamura |
| 5,811,205 A | 9/1998 | Andrieu et al. |
| 5,821,733 A | 10/1998 | Turnbull |
| 5,928,436 A | 7/1999 | Borkowski et al. |
| 6,001,139 A | 12/1999 | Asanuma et al. |
| 6,033,796 A | 3/2000 | Baji |
| 6,709,778 B2 | 3/2004 | Johnson |
| 6,737,180 B2 | 5/2004 | Johnson |
| 2005/0095506 A1* | 5/2005 | Klaassen | 429/322 |
| 2005/0208353 A1* | 9/2005 | Johnson | 429/27 |
| 2006/0063051 A1* | 3/2006 | Jang | 429/29 |

FOREIGN PATENT DOCUMENTS

| | | |
|---|---|---|
| EP | 0 071 271 | 2/1983 |
| EP | 0 168 062 | 1/1986 |

OTHER PUBLICATIONS

Wang et al.; Characterization of Thin-Film Rechargeable Lithium Batteries with Lithium Cobalt Oxide Cathodes; (J. Electrochem. Soc., vol. 143, No. 10, Oct. 1996, pp. 3203-3213).

Fragnaud et al.; Thin-film cathodes for secondary lithium batteries; Journal of Power Sources 54 (1995) no month pp. 362-366.

Kenny et al.; The preparation and characterization of lithium cobalt oxide thin films by LPCVD; Materials Research Society vol. 415 (1996) no month pp. 213-217.

Schoonman et al.; Thin film solid electrodes for rechargeable lithium-ion batteries; Journal of Power Sources 68 (1997) no month pp. 65-68.

Chen et al.; Fabrication of LiCoO2 thin film cathodes for rechargeable lithium better by electrostatic spray pyrolysis; Solid State Ionics 80 (1995) no month pp. 1-4.

Chen et al.; Unique porous LiCoO2 thin layers prepared by electrostatic spray deposition; Journal of Materials Science 31 (1996) no month pp. 5437-5442.

Cole, Terry; Thermoelectric Energy Conversion with Solid Electrolytes; Science vol. 221 Sep. 2, 1983 pp. 915-920.

Feldman et al.; Heat pumps using organometallic liquid absorbents; AES-vol. 38, 1998 no month pp. 403-407.

Oxidation-Reduction Reactions; pp. 417-420, Dec. 1999.

Non-aqueous Lithium-Air Batteries with an Advanced Cathode Structure; 3 pages; Arthur Dobley, Joseph DiCarlo and K.M. Abraham; Yardney Technical Productst, Inc./Lithion, Inc., Dec. 2003.

* cited by examiner

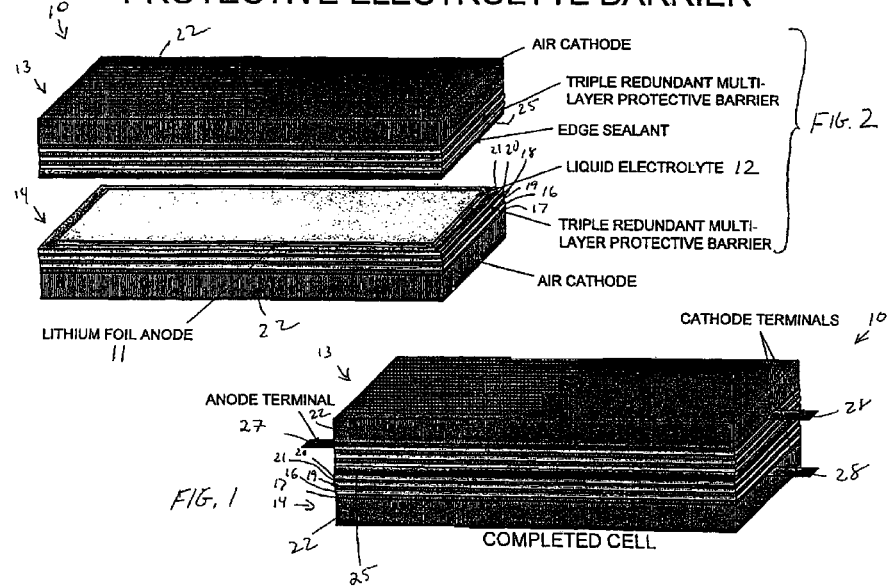

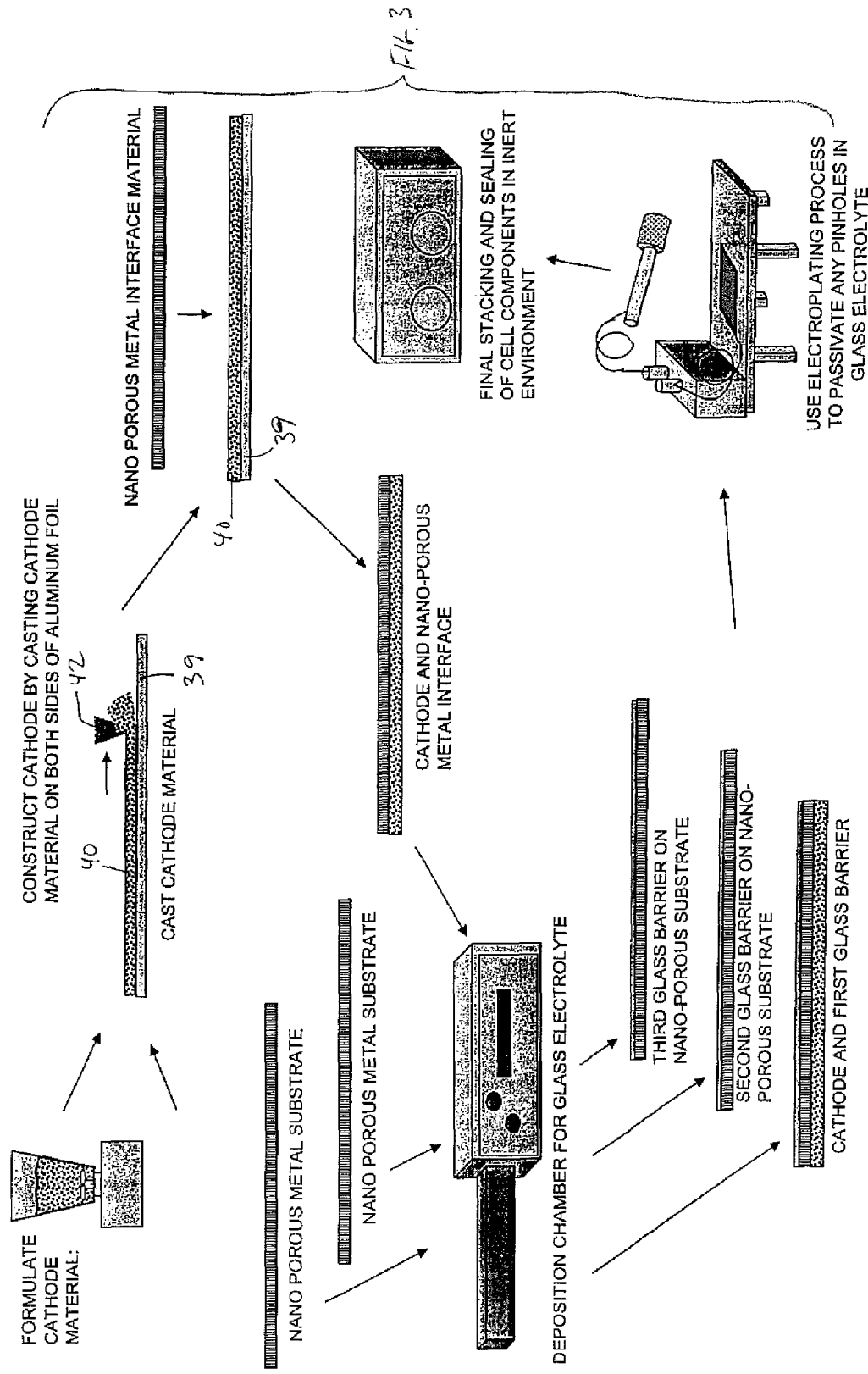

CONSTRUCT AIR CATHODE HAVING PINHOLE FREE ELECTROLYTE PROTECTIVE BARRIER

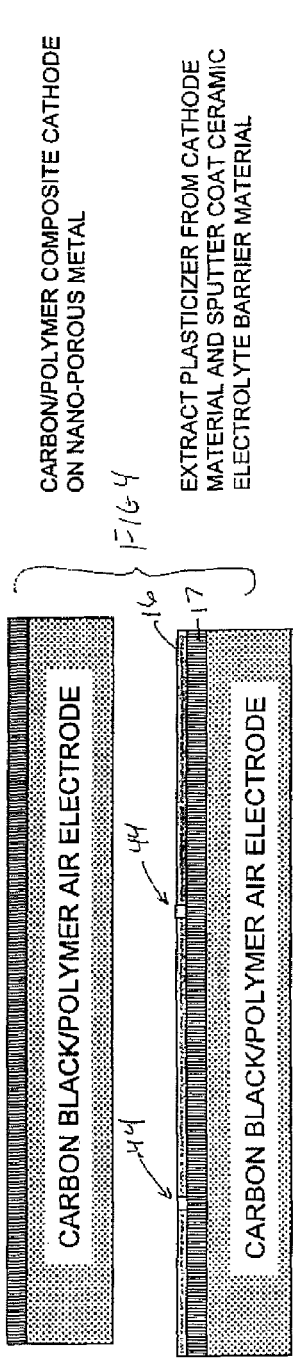

CARBON/POLYMER COMPOSITE CATHODE ON NANO-POROUS METAL

FIG. 4

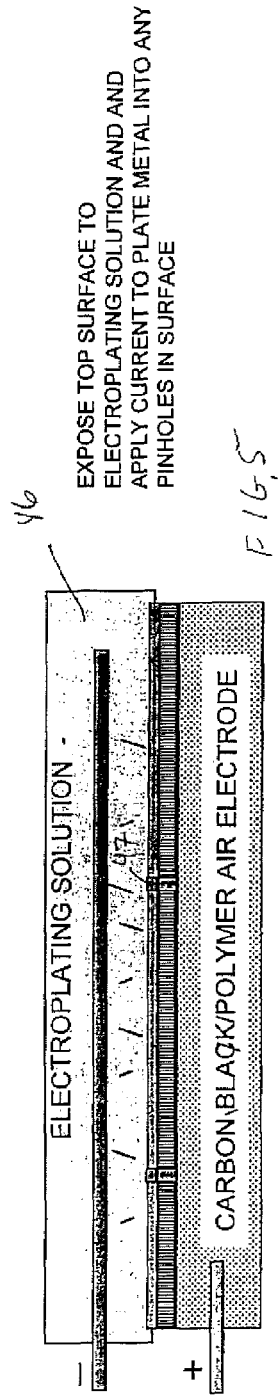

EXTRACT PLASTICIZER FROM CATHODE MATERIAL AND SPUTTER COAT CERAMIC ELECTROLYTE BARRIER MATERIAL

FIG. 5

EXPOSE TOP SURFACE TO ELECTROPLATING SOLUTION AND AND APPLY CURRENT TO PLATE METAL INTO ANY PINHOLES IN SURFACE

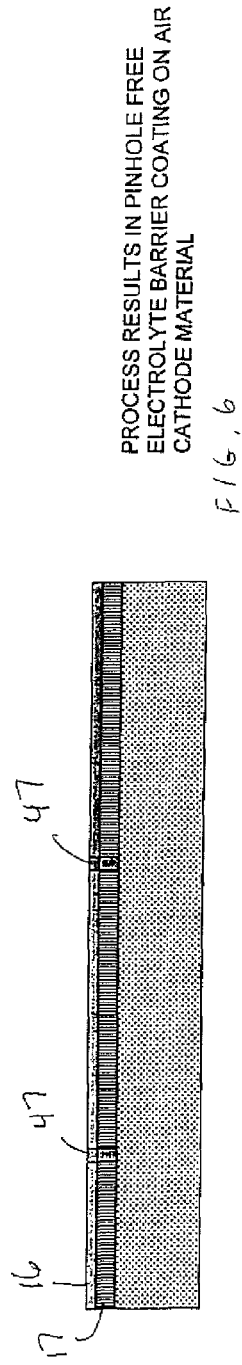

PROCESS RESULTS IN PINHOLE FREE ELECTROLYTE BARRIER COATING ON AIR CATHODE MATERIAL

FIG. 6

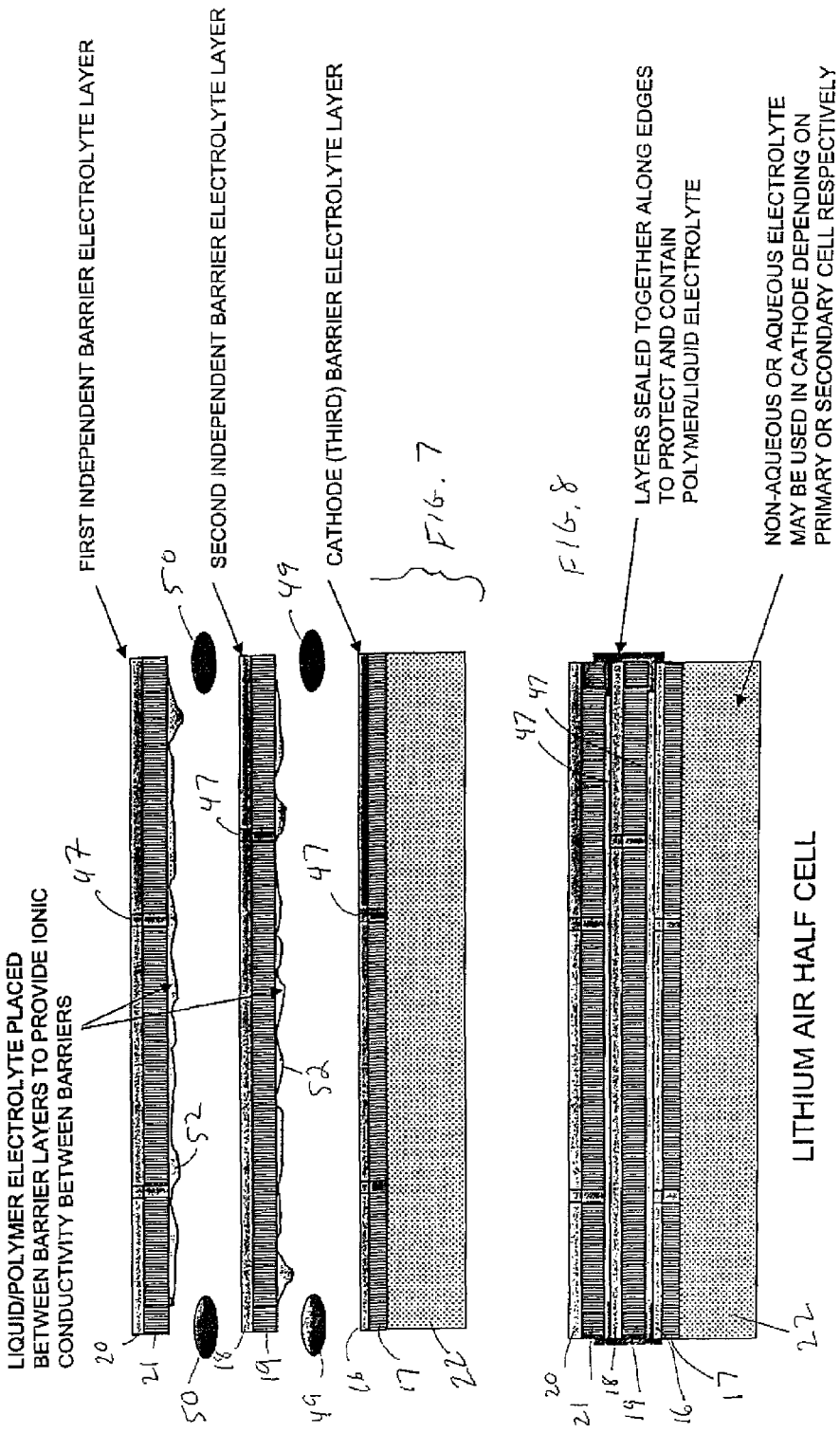

AIR BATTERY AND MANUFACTURING METHOD

REFERENCE TO RELATED APPLICATION

This is a continuation-in-part application of U.S. patent application Ser. No. 11/059,942 filed on Feb. 17, 2005 which claims benefit of U.S. provisional Patent Application Ser. No. 60/546,683 filed on Feb. 20, 2004. Applicant claims benefit of provisional Patent Application Ser. No. 60/781,399 filed Mar. 10, 2006.

TECHNICAL FIELD

This invention relates generally to batteries, and more particularly to air cathode type batteries.

BACKGROUND OF THE INVENTION

Lithium-air batteries consist of lithium anodes electrochemically coupled to atmospheric oxygen through an air cathode. Oxygen gas introduced into the battery through an air cathode is essentially an unlimited cathode reactant source. These batteries have a very high specific energy and a relatively flat discharge voltage profile.

It would be beneficial to provide an lithium-air battery that is easier to manufacture than those of the prior air. Accordingly, it is to the provision of such that the present invention is primarily directed.

SUMMARY OF THE INVENTION

In a preferred form of the invention an air battery comprising an anode, a liquid electrolyte positioned adjacent the anode, a first glass electrolyte layer positioned adjacent the liquid electrolyte, a first porous support substrate bonded to the first glass electrolyte layer, and an air cathode positioned adjacent the first porous support substrate opposite the first glass electrolyte layer.

In another preferred form of the invention, a method of manufacturing an air battery comprises the steps of providing a viscous air cathode layer, placing a first porous support substrate upon the viscous air cathode layer so as to allow a portion of the viscous air cathode layer to be drawn into the first porous support substrate, depositing a first glass barrier layer upon the first porous support substrate, positioning an anode adjacent the glass barrier layer, and positioning an electrolyte between the anode and the glass barrier layer.

BRIEF DESCRIPTION OF THE DRAWINGS

FIG. 1 is a perspective view of an air battery embodying principles of the invention in a preferred form.

FIG. 2 is a partially exploded view of the air battery of FIG. 1.

FIG. 3 is a schematic view of the manufacturing process of the battery of FIG. 1.

FIG. 4 is cross-sectional view of a portion of the air battery of FIG. 1.

FIG. 5 is a cross-sectional view of a portion of the air battery of FIG. 1 shown being electroplated.

FIG. 6 is a cross-sectional view of a portion of the air battery of FIG. 1 shown after electroplating.

FIG. 7 is a cross-sectional view of a portion of the air battery of FIG. 1.

FIG. 8 is a cross-sectional view of a portion of the air battery of FIG. 1.

DETAILED DESCRIPTION

With reference next to the drawings, there is shown in a battery or electrochemical cell 10 embodying principles of the invention in a preferred form. The battery 10 includes a lithium foil anode 11 embedded within a liquid electrolyte 12 which is positioned between two similarly constructed battery cathode halves 13 and 14. Each cathode half has a first glass barrier 16 coupled to a first porous metal substrate 17, a second glass barrier 18 coupled to a second porous metal substrate 19, a third glass barrier 20 coupled to a third porous metal substrate 21, and a lithium air cathode 22. A peripheral layer of edge sealant 25 surrounds the peripheral edge of the electrolyte 12 and bonds the two halves 13 and 14 together. The battery 10 also includes an anode terminal 27 coupled to the anode 11 and a cathode terminal 28 coupled to the cathode 22. The materials which comprise these components are discussed in more detail hereinafter.

With reference next to FIG. 3, to manufacture the battery 10 a slurry of cathode material 40 is provided. The cathode material 40 is comprised of a mixture of polymer binder, carbon and solvent or suspension liquid. The polymer binder may be a polyvinylidene difluoride (PVDF), or alternatively is may be one of many other suitable polymers commonly used in the battery industry. For example, the polymer binder may consist of PTFE or an equivalent material suspended as nano particles in a non solvent liquid suspension. The carbon is preferably an acetylene black carbon material, but may be other types of suitable carbons. A cathode current collector may be made of a material such as a thin aluminum mesh with a tab shaped extension that will later function as a cathode terminal 28 is first lad upon a casting table 39. An optional first coating of cathode material 40 is deposited or cast on top of the current collector mesh and allowed to cure. Once dry, the cathode material is pealed off the casting surface with the current collector embedded therein and turned over and laid upon the casting table with the uncoated side of the current collector facing upwardly. A second coating of cathode material 40 is then applied to the exposed surface of the current collector. The coatings may be applied to the current collector with the use of a doctor's blade 42. The preferred thickness of the cathode material is between 10 microns and 5 mm, however, the thickness depends upon the desired characteristics of the battery.

Before the second coating of cathode material cures, the first porous metal substrate or porous metal interface layer 17 is positioned upon the cathode material layer or cathode 22. The first porous metal substrate 17 is preferably a chemically non-reactive metal, such as aluminum or nickel, having a thickness of between 12 microns and 300 microns. The metal substrate 17 has pores measuring between 100 nanometers and 25 micrometers. The metal substrate 17 "floats" upon the viscous cathode material layer so that the cathode material 40 is drawn into the pores of the porous metal substrate 17 through capillary action. It is believed that only the polymer or perhaps the polymer and acetone or polymer and suspension liquid are drawn into the pores while the carbon may or may not have a particle size which prevents it from being drawn into the pores. The cured cathode layer 22 and porous metal substrate 17 are removed as a single layer from the casting table 39. This may be accomplished through simply peeling the layers from the table 39 in conventional fashion.

A glass barrier layer (first glass barrier 16) is then deposited upon the top surface of the porous metal substrate 17 opposite the cathode layer 22. The first glass barrier 16, as well as other glass barriers described hereinafter, may be made or LiPON (lithium phosphorus oxynitride, $Li_xPO_yN_z$). It should be understood that the first glass barrier 16 may be produced by other conventionally known methods of depositing such glass layers, such as deposition be chemical vapor deposition (CVD), metal organic chemical vapor deposition (MOCVD), RP sputtering, or other conventionally known techniques.

It should be noted that to further enhance the protection of the anode 11 from moisture the battery may include multiple layers of a porous metal substrate 17, 19 and 21 and glass barrier layers 16, 18 and 20 as shown in the preferred embodiment wherein each cathode half 13 and 14 includes three such combined layers. As such, the preferred embodiment shows a second porous metal substrate 19 upon which a second glass barrier 18 is deposited, and a third porous metal substrate 21 upon which a third glass barrier 20 is deposited, all deposited in similar fashion to the first glass barrier. The multiple layering of the porous substrates and glass barriers prevents pinholes 44 in one layer from propagating through the entire protective structure, i.e., any pinholes 44 created in the process are unlikely to be mutually aligned through multiple layers, as shown in FIG. 8.

The top surfaces of the first glass barrier 16, second glass barrier 18, and third glass barrier 20 are then treated by an electroplating process to passivate any pinholes 44 formed in the glass barriers, as shown in more details in FIGS. 5 through 9. The top surface of each glass barrier is exposed to the electroplating solution 46, which may be a solution of ether, aluminum chloride ($AlCl_3$), and a small percentage of lithium aluminum hydride ($LiAlH_4$), while a current is applied to the associated metal substrate. The electroplating process forms aluminum plugs 47 which fill the pinholes 44 in the glass barriers. The aluminum plug 47 also extends to the underlying pores of the metal substrates. As such, the aluminum plugs 47 fill the pinholes 44 in the glass barrier. These aluminum plugs, or at least a top portion of such, must be passivated to prevent a current from passing through the glass. The aluminum plugs may be passivated by oxidizing them by simply exposing them to an oxygen atmosphere at an elevated temperature. Alternatively, the plugs may be passivated by treating them with a tetra methyl ammonium hydroxide (TMAH) doped with a silicon, which creates a thin layer of silicon dioxide upon the plugs. Alternatively, the formation of the plugs may be ceased prior to the plugs reaching the top surface of the glass barrier, however, because of difficulties in controlling the process and the formation of the resulting plugs it is believed that silicon dioxide coating of the plugs is a more reliable solution.

As shown in FIG. 7, a peripheral layer of epoxy 49 is applied to the peripheral area between the first glass barrier 16 and the second porous metal substrate 19 so that they are bonded together along their peripheral margin. Similarly, a peripheral layer of epoxy 50 or other suitable bonding material is applied to the peripheral area between the second glass barrier 18 and the third porous metal substrate 21 so that they are bonded together along their peripheral margin. The bonding forms a multi-layered structure comprising of the first, second and third metal substrates 17, 19 and 21 and the first, second and third glass barriers 16, 18 and 20. The epoxy layers 49 and 50 create a space between adjacent glass barriers and there overlying metal substrates. These newly created spaces and the pores of the metal substrates are filled with a liquid or alternatively a liquid/polymer electrolyte material 52 to provide ionic conductivity between barriers. This may be accomplished by injecting the electrolyte material through the epoxy and then sealing the hole created by the injection device. The electrolyte material may be a liquid electrolyte such as a propylene carbonate and dimethylene and lithium phosphorous hexaflouride. It should be understood other types of electrolytes and methods of depositing electrolytes may be used as an alternative to the just described method.

As shown in FIG. 2, the battery 10 has a centrally mounted anode 11 sandwiched between two similarly configured cathodes halves 13 and 14, which each include the three passivated glass barriers 16, 18 and 20, three metal substrates 17, 19 and 21, and an air cathode 22. In an inert atmosphere environment, the two cathode halves 13 and 14 are joined together on either side of the anode 11 by applying a peripheral layer of epoxy 25 or other suitable sealant material about the peripheral area or margin of the inwardly facing top surfaces of the third glass barriers. The anode 11 includes the anode terminal 27 which extends through the sealant. The liquid electrolyte 12 is then injected within the space between the two cell portions 13 and 14 to insure ionic conductivity between the anode 11 and cathode 22. The cathode terminal 28 is then mounted to each cathode 22.

The final step in the construction process is to soak electrolyte into the cathodes 22. The cell may be placed in a suitable environment containing oxygen. Operation of the cell is such that on discharge, electric current is produced as lithium ions are conducted from the lithium metal anode through the electrolyte barrier system and into the cathode where they react with oxygen from the cells environment. The electrolyte may consist of lithium phosphorous hexafluoride salt dissolved in a solvent such as those employing propylene carbonate (PC) that are commonly used in the battery industry. Because of the volatile nature of PC based solvents and the instability of lithium phosphorous hexafluoride salt in moisture environments, cells using this type of electrolyte yield best performance in pure oxygen environments inside a hermetically sealed package.

Alternatively, cells using acetamide and lithium salt of lithium trifluoromethanesulfonimde may be used. Normally the molar salt/acetamide ratio is 1 to 4. Both lithium salt and acetamide are solid at room temperature. After mixing the two solids together, stirring it over night and then warming at 80 degree C. for 4 hours, a very clear solution is formed. The lithium ionic conductivity of the ionic liquid is $4*10^{-3}$ S/cm. This class of ionic liquid electrolyte have extremely low vapor pressure and therefore are less subject to dry out when operated in open air. As such this type of electrolyte may be used in cells that operate on oxygen from ambient air and do not have hermetically sealed packaging.

As an alternative to the just described embodiment, the cathode material may be comprised of a mixture of polymer, carbon, acetone, and a plasticizer for the polymer such as dibutyle adepate. In this approach the plasticizer is removed after the porous metal substrate has been bonded in place. The plasticizer can be removed from the polymer by rinsing the cathode structure in either or other suitable solvent such as methanol which will not dissolve the bonding polymer. In this approach, the binding polymer is configured to absorb a greater amount of electrolyte in forming the a polymer/electrolyte gel system.

In an alternative embodiment of the battery the metal mesh cathode current collector may be eliminated in which case the porous metal substrates will serve the dual function of glass electrolyte support layer and cathode current collector. In this embodiment, the cathode terminal would be attached to the metal substrate.

An additional alternative embodiment would be to substitute a porous ceramic or porous polymer material in place of porous metal substrate 17. A suitable porous ceramic material is the Anodisc Inorganic Membranes manufactured by Watman, Inc. This material is an anodized aluminum having a high porosity with their pores extending across the membrane. The membrane thickness is approximately 60 microns with an pore diameter of approximately 200 nanometers, although other pore diameters are acceptable. On the other hand porous hydrophilic Teflon separator material commonly used in manufacturing batteries may be used. In these cases, if the plugged pinhole feature is implemented, a thin metal layer may be deposited underneath the glass electrolyte layer. This seed layer will be thick enough to provide electrical continuity for the plating process but yet thin enough as to not close or cover up the pores of the substrate.

An additional alternative embodiment would be to use only a single barrier layer, that being the one having is substrate bonded directly to the cathode by the cathode polymer bonding material. In this case, the pin hole plugging option may or alternative may not be implemented.

It should be understood that while three metal and glass layers are shown in the preferred embodiment, the invention may include a single layer of metal and glass.

It should be understood that the term glass barrier is intended to include suitable ceramic barriers. It should be understood as used herein, the term air cathode is equivalent to the term air electrode.

It thus is seen that a lithium-air battery is now provided that is manufactured in an simply process. It should of course be understood that many modifications may be made to the specific preferred embodiment described herein, in addition to those specifically recited herein, without departure from the spirit and scope of the invention as set forth in the following claims.

The invention claimed is:

1. A method of manufacturing an air battery comprising the steps of:
   (a) providing a viscous air cathode layer;
   (b) placing a first porous support substrate upon the viscous air cathode layer so as to allow a portion of the viscous air cathode layer to be drawn into the first porous support substrate;
   (c) depositing a first glass barrier layer upon the first porous support substrate;
   (d) positioning an anode adjacent the glass barrier layer;
   (e) positioning an electrolyte between the anode and the glass barrier layer, and
   (f) passivating the pores of the first porous support substrate with metal plugs having an electrically insulative top layer.

2. The method of manufacturing an air battery of claim 1 wherein the first porous support substrate is selected from the group consisting of porous metal substrate, porous ceramic substrate and porous polymer substrate.

3. The method of manufacturing an air battery of claim 1 wherein the air cathode is a cathode material made from a mixture of polymer binder, carbon and a solvent or suspension liquid.

4. The method of manufacturing an air battery of claim 1 further comprising the step of mounting a second glass electrolyte layer and a second porous support substrate bonded to the second glass electrolyte layer to the first glass electrolyte layer.

5. The method of manufacturing an air battery of claim 4 further comprising mounting a third glass electrolyte layer and a third porous support substrate bonded to the third glass electrolyte layer to the second glass electrolyte layer.

6. The method of manufacturing an air battery of claim 1 wherein the anode is a lithium anode.

* * * * *